July 9, 1946.   W. D. HERSHBERGER   2,403,527
PULSE-ECHO DISTANCE INDICATOR
Filed Jan. 30, 1943
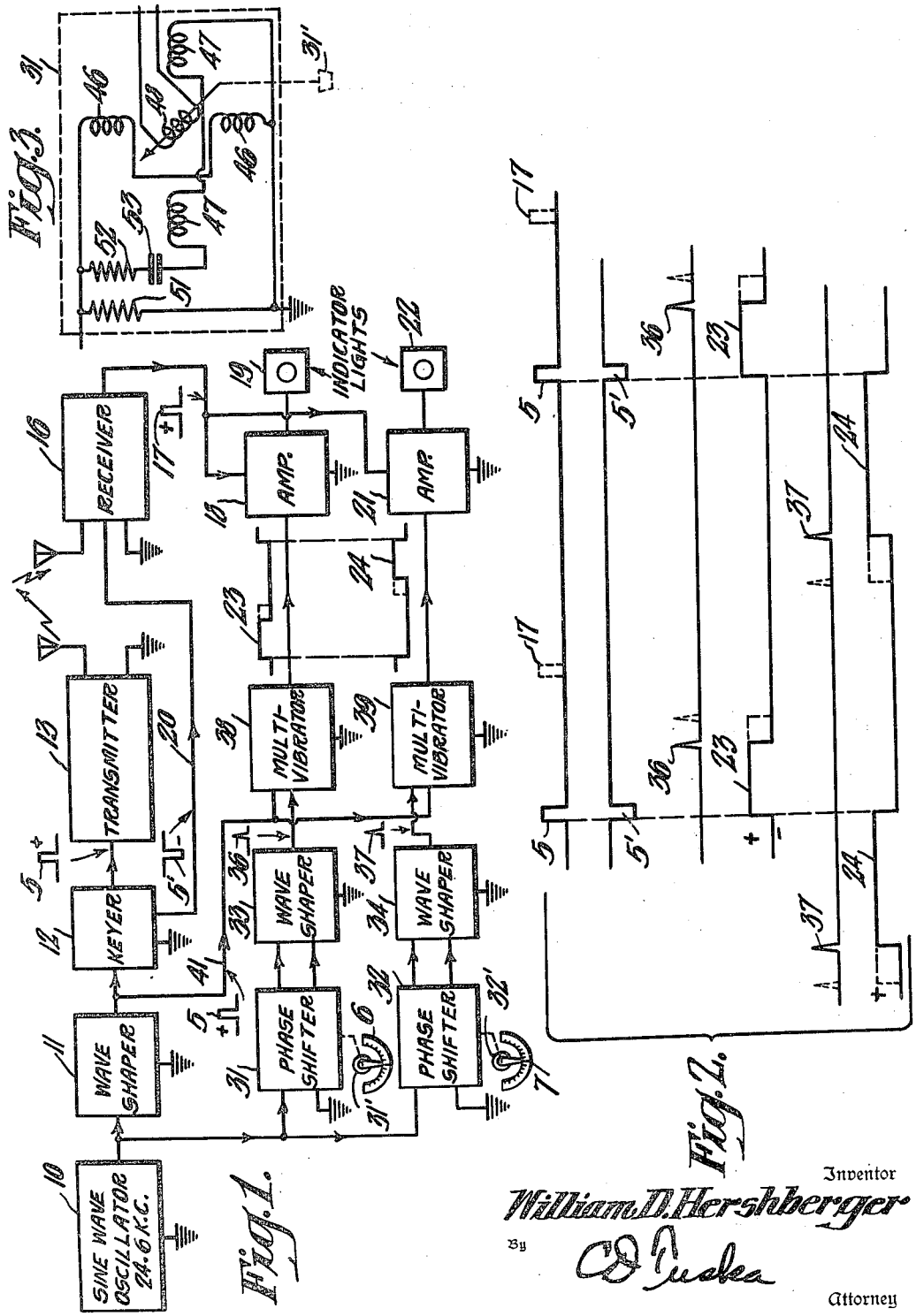
Inventor
William D. Hershberger
By
Attorney Patented July 9, 1946

2,403,527

UNITED STATES PATENT OFFICE 2,403,527

PULSE-ECHO DISTANCE INDICATOR

William D. Hershberger, Princeton, N. J., assignor to Radio Corporation of America, a corporation of Delaware Application January 30, 1943, Serial No. 474,159

7 Claims. (Cl. 250—1)

My invention relates to pulse-echo systems for indicating the presence of or the distance to reflecting objects.

The invention will be described as applied to radio locator apparatus which transmits short periodically recurring radio pulses and which receives these pulses after they are reflected from a reflecting object or surface. It is well known that the distance to the reflecting object or surface can be determined by measuring the time interval that has elapsed between the transmission of a pulse and the reception of the reflected pulse. This time interval is commonly measured by means of a cathode ray indicator tube.

An object of the present invention is to provide in a pulse-echo system a method of and means for producing an indication when the distance to a reflecting object or surface falls outside of predetermined distance limits.

A further object of the invention is to provide an improved indicator for a radio altimeter of the pulse-echo type.

A still further object of the invention is to provide an improved distance indicator for a pulse-echo system.

In one preferred embodiment of the invention a radio altimeter is provided with two indicating devices (two lamps, for example) which are connected to receive the reflected pulses from two amplifiers, respectively, under certain conditions. These amplifiers are normally biased to cut-off but are rendered operative periodically at such intervals that the lamps are lighted only when the altitude is less than a predetermined altitude limit or when the altitude or the distance to a reflecting surface is greater than a predetermined altitude or distance limit and within the range of the altimeter. The latter condition is encountered either when the aircraft exceeds a predetermined altitude or when there is an obstacle such as a mountain in the path of the aircraft.

The above-mentioned periodic biasing or keying of the amplifiers may be accomplished by applying positive rectangular voltages thereto from trigger amplifiers or multivibrators. The output from one trigger amplifier renders the amplifier for one lamp operative for a short period immediately following the transmission of a pulse while the output from the other trigger amplifier renders the amplifier for the other lamp operative for a short period immediately preceding the transmission of a pulse. Between these two periods the reception of a reflected pulse will not light either one of the indicator lamps.

The invention will be better understood from the following description taken in connection with the accompanying drawing in which Figure 1 is a block diagram of one embodiment of the invention; Figure 2 is a group of graphs which are referred to in explaining the invention; and Figure 3 is a circuit diagram of a phase shifter that may be employed in the apparatus of Fig. 1. In the several figures similar parts are indicated by similar reference characters.

In Fig. 1 the invention is shown applied to a radio altimeter which comprises a sine wave oscillator 10, a wave shaper 11 for producing periodic pulses 5, and a keyer 12 for modulating or keying a high frequency radio transmitter 13 by the pulses 5 whereby pulses of radio frequency energy are radiated to the reflecting object or surface. In the case of an altimeter mounted on an aircraft to give an indication of an obstacle ahead as well as an indication of altitude, the radiation of the pulses is downward and forward.

The reflected pulses are received and demodulated by a receiver 16. The resulting pulses, indicated at 17, are supplied to an amplifier 18 which is connected to energize an indicator lamp 19, and to an amplifier 21 which is connected to energize an indicator lamp 22. The amplifiers 18 and 21 are normally biased to cut-off so that the received pulses 17 will not energize the indicator lamps 19 and 22 unless the positive pulses 23 and 24 are being impressed upon the amplifiers 18 and 21, respectively. Negative pulses 5' may be supplied to the receiver 16 over a conductor 20 to make it insensitive during the transmission of a pulse.

Referring to Fig. 2, the positive rectangular pulses 23 are initiated by the transmitter keying pulses 5 and last for an adjustable period following the transmitted pulse. The positive rectangular pulses 24 are initiated at an adjustable time after the termination of the pulses 23 and last until the occurrence of the next transmitter keying pulse 5. It will be apparent that if the reflected pulses arrive at the receiver at a time between the end of a pulse 23 and the start of a pulse 24, neither of the indicator lamps 19 and 22 will be lighted. If lamp 19 lights, it indicates that the aircraft is too low; if lamp 22 lights, it indicates either that the aircraft is too high or that there is an obstacle ahead.

The rectangular pulses 23 and 24 may be obtained by supplying signal from the sine wave oscillator 10 to the adjustable phase shifters 31 and 32 (one of which is shown in detail in Fig. 3). The sine wave signals from the phase shifters 31 and 32 are supplied to suitable wave shapers 33 and 34, respectively, to produce voltage pulses, indicated at 36 and 37, which have a repetition rate equal to the frequency of the sine wave signals. Suitable wave shapers are well known and may comprise, for example, a clipping tube or tubes for changing the sine waves to waves that are substantially rectangular, a differentiating circuit for obtaining narrow pulses from the substantially rectangular waves, and additional clipping means.

The pulses 36 and 37 are impressed upon trigger amplifiers or multivibrators 38 and 39, respectively, at the proper points so that pulse 36 terminates the rectangular pulse 23 produced by trigger amplifier 38, and so that pulse 37 initiates the rectangular pulse 24 produced by trigger amplifier 39. The time relation between the several pulses is shown in Fig. 2. The start of the pulse 23 and the termination of the pulse 24 are determined by the keying pulse 5 which may be supplied from the wave shaper 11 over a conductor 41 to the trigger amplifiers 38 and 39. The time relations between the pulses 23 and 24 and the pulse 5 are shown in Fig. 2.

The phase shifters 31 and 32 may be of the type shown in Fig. 3 in which inductance coils 46 and 47 are placed so the axis of coil 46 makes an angle of 90 degrees with the axis of coil 47 and have signals applied to them 90 degrees out of phase to produce a rotating field. The 90 degree phase shift may be obtained by means of a resistor-capacitor network comprising resistors 51 and 52 and capacitor 53. A rotatably adjustable pickup coil 48 is mounted in the rotating field whereby the desired phase relation of input signal to output signal may be obtained by turning a phase adjustment knob 31'.

It will be apparent that the time of occurrence of the pulses 36 and 37 may be advanced or retarded by changing the adjustments of the phase shifters 31 and 32, respectively. Thus, as indicated by the dotted line portions of the graphs in Fig. 2, the duration of the pulse 23 may be increased or decreased to determine the lower altitude limit at which the indicator lamp 19 will light, and the starting time of the pulse 24 may be changed to determine the upper altitude or distance limit at which the indicator lamp 22 will light. Therefore, as previously stated, one indicator will give a warning signal when the altitude of the aircraft is below a predetermined adjustable limit and the other indicator will give a warning when the altitude is above a predetermined adjustable limit or when an obstacle is being approached.

The phase shifters 31 and 32 preferably are calibrated in distance so that the distance to the reflecting surface may be found by rotating the phase adjustment knobs 31' or 32', respectively, to the point where the indicator lamps 19 or 22, respectively, either light up if previously dark or extinguish if previously lighted. For example, the altitude may be determined by adjusting the phase shifter 31 until the lamp 19 blinks on and off when the knob 31' is rotated left and right very slight amounts. The pointer on knob 31' then shows the altitude reading on the associated scale 6.

Similarly the altitude may be determined by adjusting the phase shifter 32 and reading the distance off the scale 7. It may be noted that if, when in flight, the lamp 22 lights, the pilot cannot tell from this alone whether he has exceeded the upper limit of altitude or is approaching an obstacle. This can be checked quickly, however, by adjusting the phase shifter 31 to see what the altitude actually is, and, if necessary, by also adjusting the phase shifter 32 to find the distance to the reflecting surface that has caused the lamp 22 to light.

I claim as my invention:

1. A pulse-echo system comprising means for transmitting pulses, means for receiving said pulses after reflection from a surface or object, a pair of indicating devices, means for supplying the received pulses to said indicating devices, means for producing two groups of control pulses having a definite phase relation with respect to the transmitted pulses, and means responsive to said two groups of control pulses for making said indicating devices effective, respectively, to produce an indication only during a predetermined period following the transmission of a pulse and an indication only during a predetermined period preceding the transmission of a pulse.

2. The invention according to claim 1 wherein means is provided for adjusting the widths of the control pulses in said two groups.

3. A pulse-echo system comprising means for transmitting periodically recurring pulses, means for receiving said pulses after reflection from a surface or object, an indicating device, means including an amplifier for supplying the received pulses to said indicating device, said amplifier normally being biased to cut-off, means for producing control pulses of positive polarity having a definite phase relation with respect to the transmitted pulses, means for adjusting the duration of said control pulses, and means for applying said positive control pulses to said amplifier to make it effective to pass the received pulses to said indicating device for the duration of each control pulse.

4. A pulse-echo system comprising means for transmitting perodically recurring pulses, means for receiving said pulses after reflection from a surface or object, an indicating device, means including an amplifier for supplying the received pulses to said indicating device, said amplifier normally being biased to cut-off, means for producing control pulses having a known phase relation with respect to the transmitted pulses, means for adjusting the phase of said control pulses with respect to the transmitted pulses, means for producing positive control pulses having a duration which is determined by the phasing of said control pulses, and means for applying said positive control pulses to said amplifier to make it effective to pass the received pulses to said indicating device for the duration of each control pulse.

5. A pulse-echo system comprising means for transmitting pulses, means for receiving said pulses after reflection from a surface or object, a pair of indicating devices, means including a pair of amplifiers for supplying the received pulses to said pair of indicating devices, respectively, said amplifiers normally being biased to cut-off, means for producing two groups of control pulses of positive polarity having a known phase relation and duration with respect to the transmitted pulses, means for adjusting the duration of said control pulses with respect to the transmitted pulses, and means for applying said two groups of positive control pulses to said amplifiers, respectively, to make them effective to pass the received pulses to said indicating devices for the duration of each applied control pulse.

6. A pulse receiver for a system that includes means for transmitting pulses, said receiver comprising means for receiving said transmitted pulses after they have been reflected from a surface or object, indicating means, means for supplying the received pulses to said indicating means, means for producing first control pulses that occur immediately following the transmission of a pulse, means for producing second control pulses that occur immediately preceding the transmission of a pulse but after the termination of the first control pulses, and means responsive to said first and second control pulses for causing said indicating means to indicate when the reflected pulses are received during the occurrence of either the first control pulses or the second control pulses.

7. A pulse receiver for a system that includes means for transmitting pulses, said receiver comprising means for receiving said transmitted pulses after they have been reflected from a surface or object, two indicating devices, means for supplying the received pulses to said indicating devices, means for producing control pulses that occur immediately following the transmission of a pulse, means for producing second control pulses that occur immediately preceding the transmission of a pulse but after the termination of the first control pulses whereby there is a certain period between a first control pulse and the following second control pulse, means responsive to said first control pulses for causing one of said indicating devices to indicate when the reflected pulses are received during the occurrence of the first control pulses, and means responsive to said second control pulses for causing the other of said indicating devices to indicate when the reflected pulses are received during the occurence of the second control pulses.

WILLIAM D. HERSHBERGER.

Disclaimer 2,403,527.—*William D. Hershberger*, Princeton, N. J. PULSE-ECHO DISTANCE INDICATOR. Patent dated July 9, 1946. Disclaimer filed Nov. 5, 1949, by the assignee, *Radio Corporation of America*.

Hereby enters this disclaimer to claims 3 and 4 of said patent.

[*Official Gazette December 27, 1949.*]